(12) United States Patent
Kim

(10) Patent No.: US 7,361,285 B2
(45) Date of Patent: *Apr. 22, 2008

(54) METHOD FOR FABRICATING CLICHE AND METHOD FOR FORMING PATTERN USING THE SAME

(75) Inventor: Chul-Ho Kim, Incheon (KR)

(73) Assignee: LG.Philips LCD Co., Ltd., Seoul (KR)

( * ) Notice: Subject to any disclaimer, the term of this patent is extended or adjusted under 35 U.S.C. 154(b) by 111 days.

This patent is subject to a terminal disclaimer.

(21) Appl. No.: 11/114,107

(22) Filed: Apr. 26, 2005

(65) Prior Publication Data

US 2005/0243233 A1    Nov. 3, 2005

(30) Foreign Application Priority Data

Apr. 30, 2004    (KR) .................. 10-2004-0030768

(51) Int. Cl.
*C23F 1/00*    (2006.01)
*C03C 15/00*   (2006.01)
*B44C 1/22*    (2006.01)

(52) U.S. Cl. ..................... 216/41; 216/24; 216/76; 216/79; 216/80; 101/41; 101/163; 101/170; 347/19; 347/46; 349/43

(58) Field of Classification Search .............. 216/41
See application file for complete search history.

(56) References Cited

U.S. PATENT DOCUMENTS 6,375,870 B1 *  4/2002  Visovsky et al. ......... 264/1.31

FOREIGN PATENT DOCUMENTS

JP    2002-280711    9/2002
JP    2003-082469    3/2003

* cited by examiner

*Primary Examiner*—Binh X. Tran
*Assistant Examiner*—Patricia A. George
(74) *Attorney, Agent, or Firm*—McKenna Long & Aldridge LLP

(57) ABSTRACT

A method for fabricating a cliché including: providing a transparent glass substrate; depositing a metal layer on the substrate; patterning the metal layer and thereby forming a first metal pattern; etching the glass substrate by using the first metal pattern as a mask and thereby forming a first convex pattern; patterning the first metal pattern and thereby forming a second metal pattern; and etching the first convex pattern by using the second metal pattern as a mask and thereby forming a second convex pattern.

17 Claims, 11 Drawing Sheets

METHOD FOR FABRICATING CLICHE AND METHOD FOR FORMING PATTERN USING THE SAME

This application claims the benefit of Korean Patent Application No. 30768, filed on Apr. 30, 2004, which is hereby incorporated by reference for all purposes as if fully set forth herein.

BACKGROUND OF THE INVENTION

1. Field of the Invention

The present invention relates to a printing method for forming a pattern in a liquid crystal display panel, and more particularly, to a method for fabricating a cliché used to form a pattern with uniform thickness on the entire surface of a substrate and a method for forming a pattern using the same.

2. Description of the Related Art

A display device, especially, a flat panel display such as a liquid crystal display (LCD) device is driven by being provided with an active device such as a thin film transistor at each pixel. The driving method is called as an active matrix driving method. According to the active matrix driving method, the active device is arranged at each pixel arranged as a matrix form to drive a corresponding pixel.

FIG. 1 is a view illustrating an active matrix type LCD device. The LCD device is a TFT LCD device in which a thin film transistor is used as an active device. As illustrated, at each pixel of the TFT LCD device that N×M pixels are arranged horizontally and vertically, provided is a TFT formed at a gate line 4 to which a scan signal is applied from an external driving circuit and a data line 6 to which an image signal is applied. The TFT includes a gate electrode 3 connected to the gate line 4, a semiconductor layer 8 formed on the gate electrode 3 and activated as a scan signal is applied to the gate electrode 3, and a source/drain electrode 5 formed on the semiconductor layer 8. A pixel electrode 10 is formed at a display region of the pixel 1. The pixel electrode 10 is connected to the source/drain electrode 5 and operates liquid crystal (not illustrated) by receiving an image signal through the source/drain electrode 5 as the semiconductor layer 8 is activated.

FIG. 2 is a view illustrating a structure of the TFT arranged at each pixel. As illustrated, the TFT includes a substrate 20 formed of a transparent insulating material such as glass, a gate electrode 3 formed on the substrate 20, a gate insulating layer 22 formed on the entire surface of the substrate 20, a semiconductor layer 8 formed on the gate insulating layer 22 and activated as a signal is applied to the gate electrode 3, a source/drain electrode 5 formed on the semiconductor layer, and a passivation layer 25 formed on the source/drain electrode 5 for protecting the device.

The source/drain electrode 5 of the TFT is electrically connected to a pixel electrode formed in a pixel, and displays an image by driving liquid crystal as a signal is applied to the pixel electrode through the source/drain electrode 5.

In the active matrix type LCD device, each pixel has a size corresponding to several tens of μm. Accordingly, the active device such as the TFT arranged in the pixel has to be formed to have a minute size corresponding to several μm. Moreover, as the consumer's demand for a display device of a high image quality such as an HDTV is being increased, more pixels have to be arranged on a screen of the same area. Accordingly, an active device pattern arranged in each pixel (including a gate line pattern and a data line pattern) has to be also formed to have a minute size.

In order to fabricate an active device such as a TFT according to the related art, a pattern, a line, etc. of the active device is formed by a photolithographic process using an exposing device. However, the photolithographic process is composed of a series of processes such as a photoresist deposition, an alignment process, an exposure process, a developing process, a cleaning process, and the like.

Also, the photolithographic process has to be repeated many times in order to form a pattern of the LCD device thereby lowering productivity.

SUMMARY OF THE INVENTION

Accordingly, the present invention is directed to a method for fabricating a cliché and method for forming a pattern using the same that substantially obviates one or more of the problems due to limitations and disadvantages of the related art.

Therefore, an advantage of the present invention is to provide a printing method for forming a pattern which enhances productivity by forming the pattern with a single process.

Another advantage of the present invention is to provide a printing method for forming a pattern with a uniform thickness.

Still another advantage of the present invention is to provide a method for fabricating a cliché with an increased an adhesion force to ink.

Additional features and advantages of the invention will be set forth in the description which follows, and in part will be apparent form the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described herein, there is provided A method for fabricating a cliché comprising: providing a transparent glass substrate; depositing a metal layer on the substrate; patterning the metal layer to form a first metal pattern; etching the glass substrate using the first metal pattern as a mask, thereby forming a first convex pattern; patterning the first metal pattern to form a second metal pattern; and etching the first convex pattern using the second metal pattern as a mask, thereby forming a second convex pattern.

In another aspect of the present invention, there is provided a method for fabricating a cliché comprising: providing a transparent glass substrate; depositing a photoresist on the substrate; forming a first photoresist pattern having a first thickness and a second photoresist pattern having a second thickness, the first and second photoresist patterns alternating with each other; etching the glass substrate using the first photoresist pattern as a mask, thereby forming a first convex pattern; and removing the first photoresist pattern, then etching the first convex pattern using the second photoresist pattern as a mask, thereby forming a second convex pattern.

In another aspect of the present invention, there is provided A method for forming a pattern comprising: providing a cliché having a plurality of convex patterns and a plurality of convexo concavo patterns on surfaces of the convex patterns; forming an etching object layer on a substrate; applying ink on the etching object layer; attaching the cliché and the substrate to each other so that the surfaces of the convex patterns are in contact with the ink applied onto the etching object layer; and separating the substrate and the cliché from each other, thereby forming an ink pattern that partially remains on the etching object layer.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

According to the present invention, a printing method is used to form an active device pattern of a display device such as an LCD device. As the printing method, a gravure offset printing method is used in each field such as for publishing, packaging, cellophane, vinyl, polyethylene, etc. by applying ink on a concave plate and then scratching the redundant ink. For example, a gravure offset printing method is used to fabricate an active device or a circuit pattern for a display device.

The gravure offset printing method transfers ink onto a substrate using a transfer roller. Furthermore, if a transfer roller corresponding to an area of a desired display device is used, a pattern can be formed on the substrate of the display device with a single transfer even if the display device has a large area.

The gravure offset printing method can be used to form various kinds of patterns for a display device, for example, TFT patterns, gate lines, data lines, pixel electrodes, and a metal pattern for a capacitor in case of an LCD device.

Figure 1:
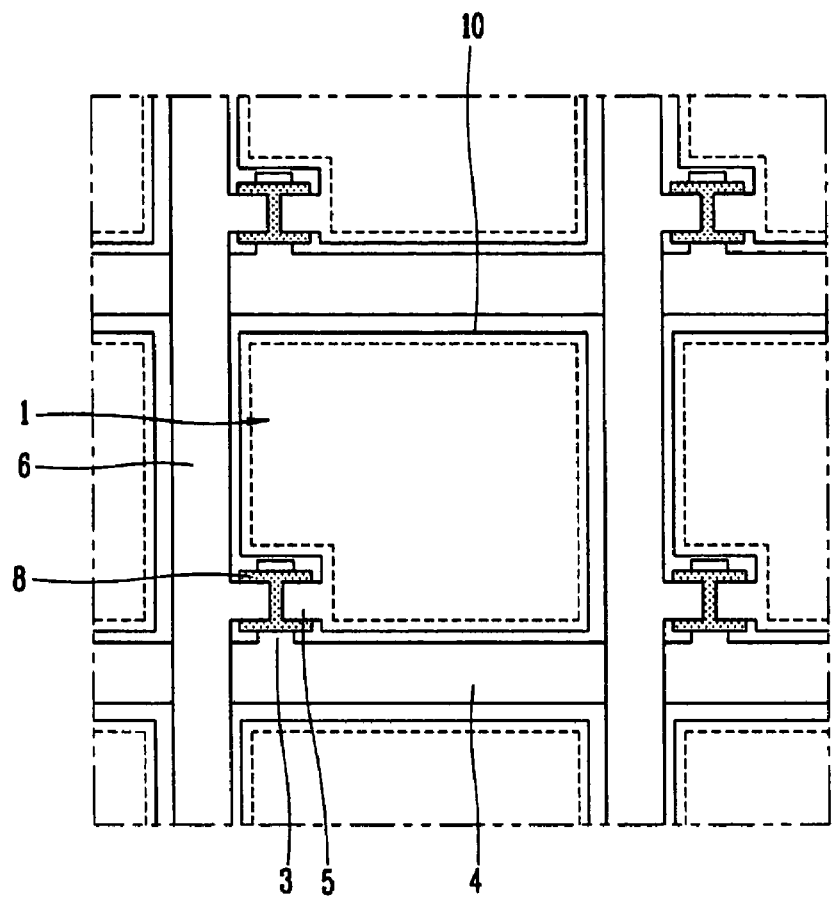
FIG. 1 is a plane view illustrating a structure of a general LCD device.
Figure 2:
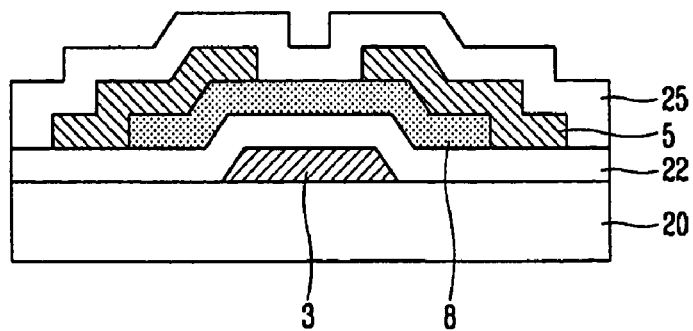
FIG. 2 is a sectional view illustrating a structure of a thin film transistor of the LCD device in FIG. 1.
Figure 3A:
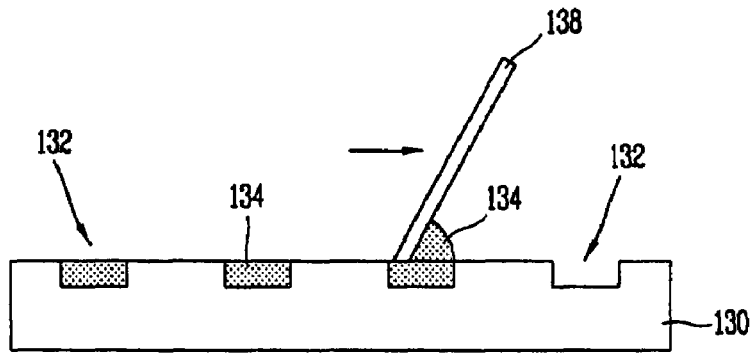
FIGS. 3A to 3C are views illustrating a method for forming a pattern using a gravure offset printing method.
Figure 3B:
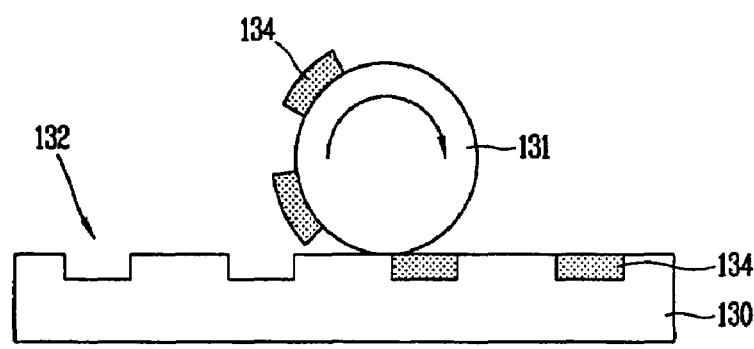
Figure 3C:
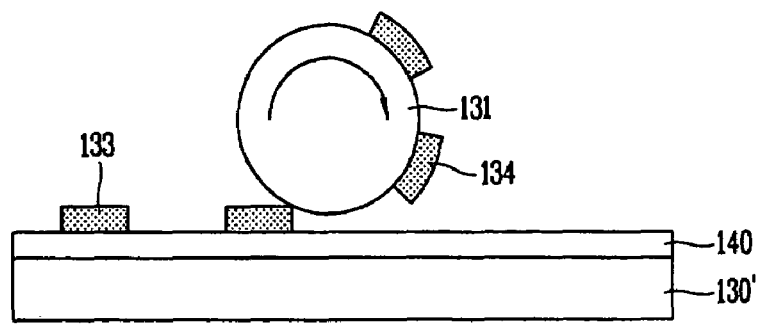

FIGS. 3A to 3C are views illustrating a gravure offset printing method for forming a pattern according to an embodiment of the present invention. As illustrated in FIG. 3A, a plurality of grooves 132 are formed at specific positions to form a concave plate or cliché 130, and then filled with ink 134. The grooves 132 are formed in the cliché 130 using a general photolithographic process. The grooves are filled with ink 134 by applying the ink 134 on the surface of the cliché 130 and then pushing a blade 138 across the surface of the cliché 130. As the blade 138 is moved on the cliché 130, the ink 134 is filled in the groove 132 and at the same time the ink 134 remaining on the surface of the cliché 130 is removed.

The ink 134 remaining in the grooves 132 of the cliché 130 is then transferred onto a surface of a printing roller 131 as the printing roller is rotated across the surface of the cliché 130 as illustrated in FIG. 3B. The printing roller 131 has the same width as that of the display panel to be fabricated, and has a circumference that is the same length as that of the panel to be fabricated. Accordingly, the ink 134 of the cliché 130 is transferred onto the surface of the printing roller 131 with a single rotation of the printing roller 131.

As illustrated in FIG. 3C, the printing roller 131 is then rotated across the surface of an etching object layer 140 formed on a substrate 130', thereby transferring the ink 134 onto the etching object layer 140. The ink 134 is thereafter dried by irradiating ultraviolet rays or by heat to form an ink pattern 133. The ink pattern 133 is also formed on the entire surface of the substrate 130' with a single rotation of the printing roller 131. The etching object layer 140 is etched using the ink pattern 133 as a mask to form a desired pattern.

In the aforementioned printing method, the cliché 130 and the printing roller 131 are fabricated according to the size of a desired display device, such that a pattern can be formed on the substrate 130' with a single transfer of the printing roller 131. Accordingly, a pattern of a display device of a large area can be formed by a single process.

The etching object layer 140 may be a metal layer for forming a gate electrode, a source/drain electrode, a gate line, a data line of a TFT, or a pixel electrode, a semiconductor layer for forming an active layer, or an insulating layer such as SiOx or SiNx.

In case of forming a pattern of a display device, the ink pattern 133 serves as a resist in the conventional photolithographic process. Accordingly, the ink pattern 133 is formed on a metal layer or an insulating layer, and then the layer is etched using a general etching process, thereby forming a layer with the desired pattern, for example, an electrode structure, a contact hole, and the like.

The printing method of the present invention has many advantages. The most representative advantage is that an ink pattern is formed on a display device with a large area with a single process which is simpler than the conventional photolithographic process.

As the size of the printing roller increases, the likelihood of a non-uniform pressure being applied to the substrate when the ink pattern is transferred from the surface of the printing roller increases. Accordingly, the ink pattern formed on the substrate may have a non-uniform thickness.

To solve the problem, a method for forming a pattern on a substrate without using a printing roller is provided. Accordingly, to this embodiment of the invention ink is applied directly on the substrate and then partially removed using a cliché, such the remaining ink provides the desired pattern, as illustrated in FIGS. 4A to 4G and FIGS. 5A to 5G.

Figure 4A:
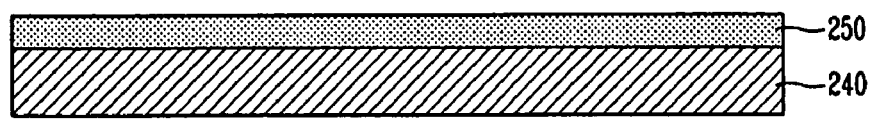
FIGS. 4A to 4G are views illustrating a method for forming a pattern according to the present invention.
Figure 5A:
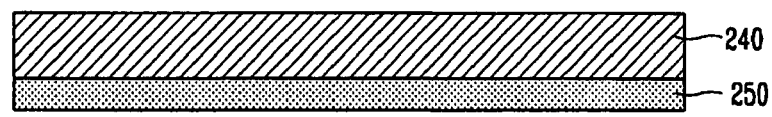
FIGS. 5A to 5G are views illustrating a method for forming a pattern according to another embodiment of the present invention.

According to this embodiment of the invention, a ink 250 is applied to the entire surface of a substrate 240, as illustrated in FIG. 4A and FIG. 5A. The substrate 240 includes an etching object layer, and the ink 250 is applied onto the etching object layer.

Figure 4B:
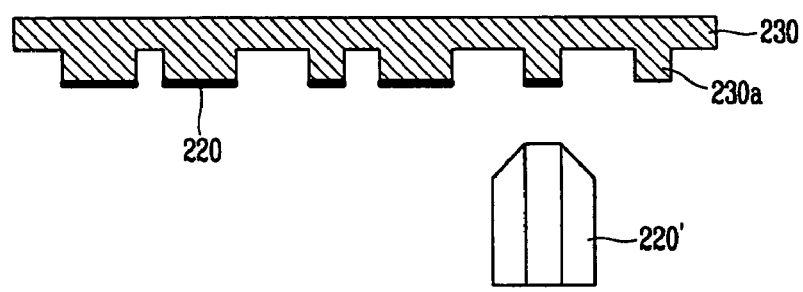
Figure 5B:
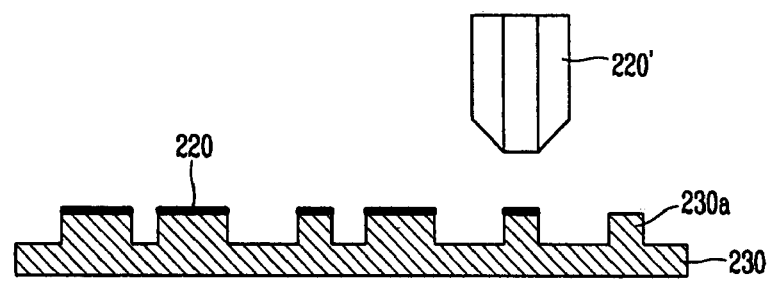

A cliché 230 having a plurality of convex patterns 230a is formed, for example, from a transparent glass substrate. The cliché may be formed by depositing a metal layer on a glass substrate, and patterning the metal layer to form a metal pattern. Then, the glass substrate is etched using the metal pattern as a mask to form convex patterns as illustrated in FIG. 4B and FIG. 5B. The cliché 230, having a plurality of convex patterns 230a is prepared, and then an adhesion force intensifier 220, for example, Hexa Methyl Disilazane (HMDS), is applied to the surface of the convex pattern 230a using an adhesion force intensifying applicator 220'.

Figure 4C:
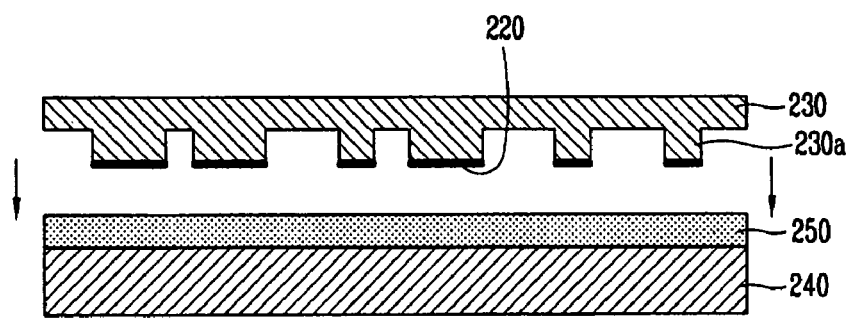
Figure 4D:
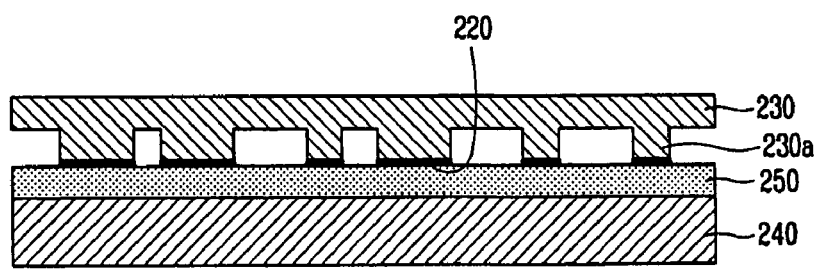

As illustrated in FIG. 4C, an ink layer 250 applied onto the substrate 240 is arranged to face the convex patterns 230a of the cliché 230. The substrate 240 is positioned at a lower side and the cliché 230 is positioned at an upper side. Then, the cliché 230 is moved downward and applied with uniform pressure so that the convex patterns 230a of the cliché 230 come into contact with the ink layer 250.

Figure 5C:
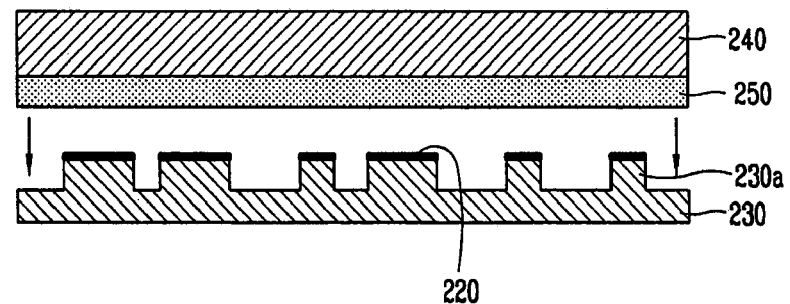
Figure 5D:
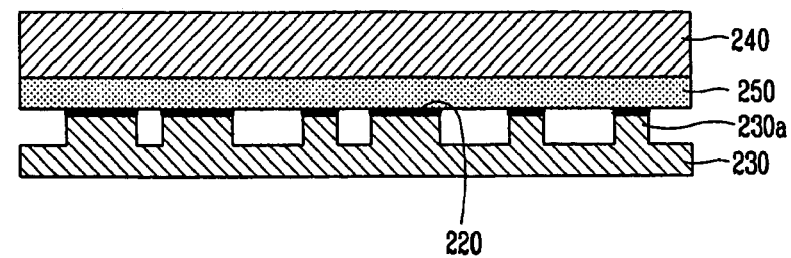

As illustrated in FIG. 5C, it is also possible to position the substrate 240 at an upper side and to position the cliché 230 at a lower side. In this case, the substrate 240 is moved downward to contact the ink layer 250 of the substrate 240 to the convex patterns 230a of the cliché 230.

Figure 4E:
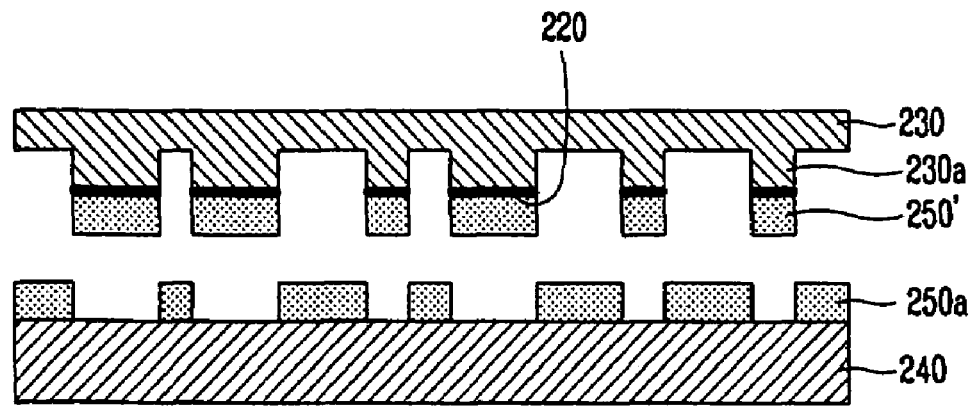
Figure 5E:
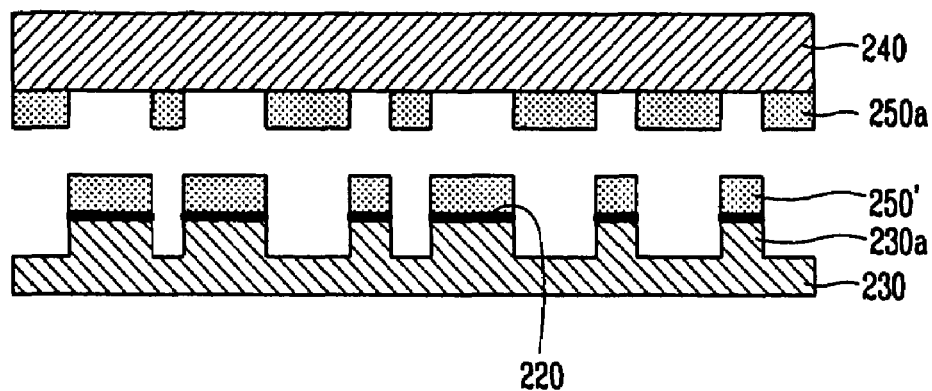

As illustrated in FIG. 4E, when the cliché 230 is detached from the substrate 240, or the substrate 240 is detached from the cliché, as illustrated in FIG. 5E, the ink 250' in the regions that are in contact with the convex patterns 230a is attached to the surfaces of the convex patterns 230a and therefore removed from the substrate 240. Accordingly, an ink pattern 250a is formed on the substrate 240, and the ink pattern 250a remains at a region that is not in contact with the convex patterns 230a of the cliché 230. The adhesion force intensifier 220 applied to the surfaces of the convex patterns 230a enhances the adhesion force between the cliché and the ink such that it is greater than the is adhesion force between the ink and the substrate 240. As a result, the ink 250' contacting the cliché 230 is easily removed from the substrate 240. Accordingly, ink in a region that is in contact with the convex patterns 230a of the cliché 230 is removed, and the ink pattern 250a is formed at a region that is not in contact with the convex patterns 230a. Accordingly, the convex patterns 230a of the cliché 230 have the same shape as the rest region except pattern regions to be formed on the substrate 240.

Figure 4F:
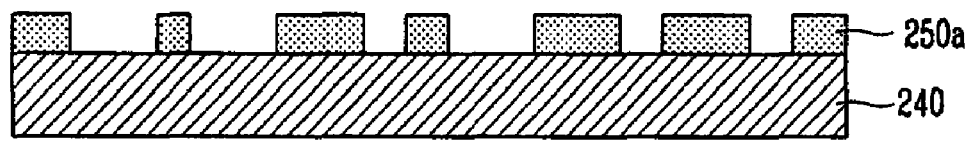
Figure 5F:
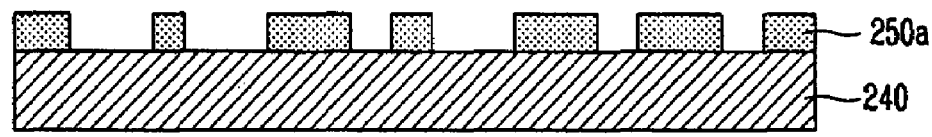

FIG. 4F and FIG. 5F illustrates the ink pattern 250a formed on the substrate 240. An etching object layer of the substrate is etched by using the ink pattern 250a as a mask to form a desired device pattern. Before using the ink pattern 250a as a mask, heat is applied or ultraviolet rays are irradiated onto the ink pattern 250a to harden the pattern.

The etching object layer may be a metal layer for forming a gate electrode, a source/drain electrode, a gate line, a data line of a TFT, or a pixel electrode, a semiconductor layer for forming an active layer, or an insulating layer such as SiOx or SiNx. When forming a pattern of a display device, the ink pattern 250a serves as a resist in the conventional photolithographic process. Accordingly, the ink pattern 250a is formed on a metal layer or an insulating layer, and then the metal layer or the insulating layer is etched by a general etching process using the ink pattern 250a as a mask, thereby forming a metal layer of a desired pattern (fore example, an electrode structure) or an insulating layer of a desired pattern (for example, a contact hole).

Figure 4G:
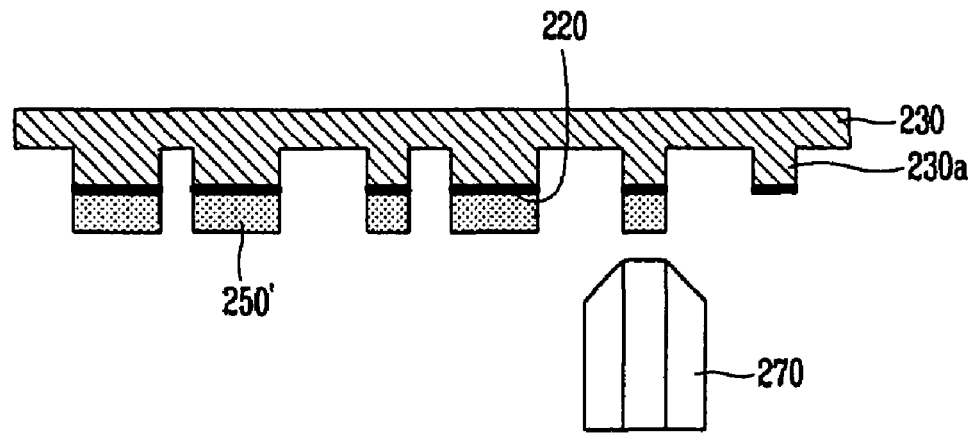
Figure 5G:
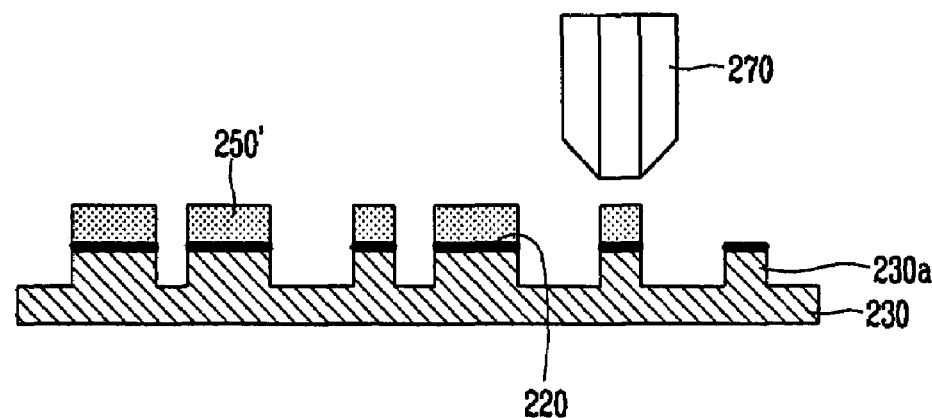

As illustrated in FIG. 4G and FIG. 5G the ink 250' and the adhesion force intensifier 220 applied to the surfaces of the convex patterns 230a of the cliché 230 can be removed from the cliché with a cleaning device 270. Cleaning solution injected from the cleaning device 270 removes the ink 250' and the adhesion force intensifier 220 applied to the surfaces of the convex patterns 230a. For example, the cleaning solution can be acetone, N-Methyle Pyrolidone (NMP) and the like.

The cleaning device can be a nozzle type which removes ink by spraying a cleaning solution from a nozzle. In addition, though not illustrated in the drawings, a roller type cleaner may be used. With the roller type cleaning device, a material capable of improving an adhesive force with respect to ink is applied onto the surface of a cleaning roller and the cleaning roller is rotated across the cliché thereby transferring the ink from the cliché to the surface of the cleaning roller. Accordingly, the ink applied onto the cliché can be removed.

According to the aforementioned embodiment of the present invention, ink is applied onto the substrate where a pattern is to be formed, then a cliché having convex patterns is applied onto the ink with a certain pressure. Accordingly, ink that is in contact with the convex patterns is detached from the substrate, and an ink pattern is formed at the rest region that is not in contact with the convex patterns. Since ink is applied onto the substrate and then the ink in unnecessary regions is removed using a cliché, an ink pattern with a uniform thickness is formed on the entire surface of the substrate.

According to another embodiment of the present invention, a method for fabricating a cliché capable of intensifying an adhesion force between the cliché and ink by forming a convexo-concavo pattern on the surfaces of the convex patterns is provided. In case of forming a convexo-concavo pattern on the surfaces of the convex patterns, a contact area between the cliché and the substrate is increased. Accordingly, an adhesion force between the cliché and the ink is increased than in the previous case (FIGS. 4A to 4G and FIGS. 5A to 5G), thereby decreasing pattern inferiority.

Figure 6A:
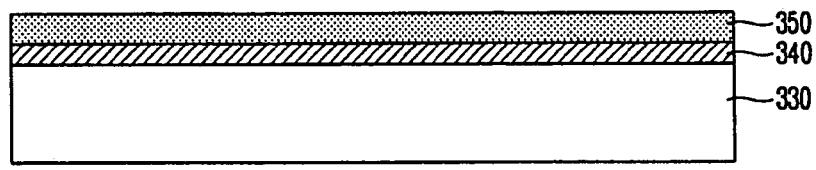
FIGS. 6A to 6E are views illustrating a method for fabricating a cliché according to the present invention.
Figure 6B:
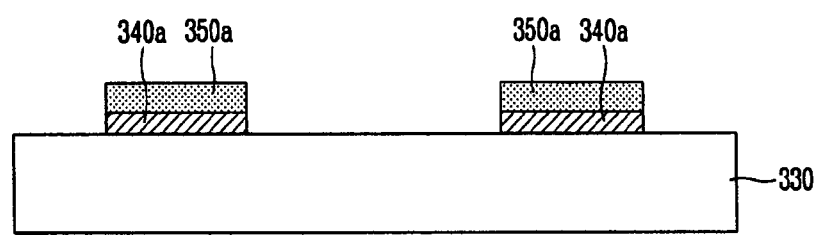
Figure 6C:
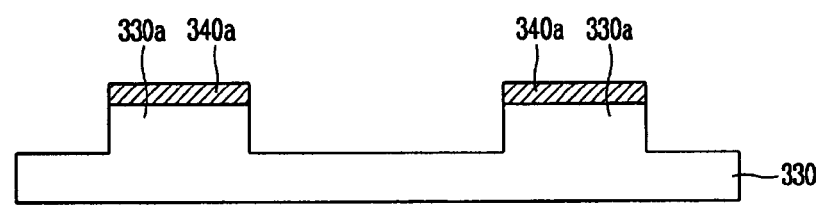

FIGS. 6A to 6E are sectional views illustrating a method for fabricating a cliché according to the present invention. As illustrated in FIG. 6A, a transparent substrate 330 is provided, and a metal layer 340 is deposited on the substrate 330. Then, a photoresist 350 is applied on the metal layer 340. Then, the photoresist 350 is patterned to form photoresist patterns 350a as illustrated in FIG. 6B. Using the photoresist patterns 350a as a mask, the metal layer is etched to form first metal patterns 340a that remain on specific regions. Then, the photoresist patterns 350a are removed, and the glass substrate 330 is etched using the first metal patterns 340a as a mask, thereby forming first convex patterns 330a on the surface of the glass substrate 330 as illustrated in FIG. 6C. The first convex patterns 330a are formed by etching the glass substrate 330, which are formed by using a part of the substrate.

Then, the first metal patterns 340a applied to the surfaces of the first convex patterns 330a are patterned, thereby forming second metal patterns 340b on the first convex patterns 330a. The second metal pattern 340b, for example, has a bar or dot shape, but is not limited to these shapes.

Figure 6D:
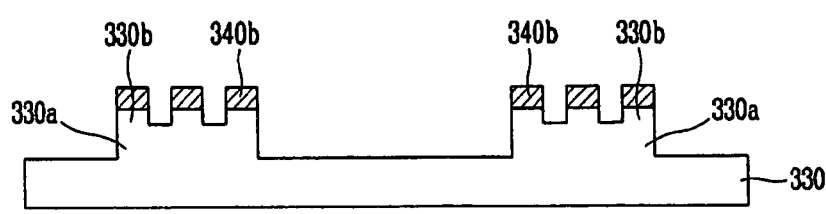
Figure 6E:

The first convex patterns 330a are etched using the second metal pattern 340b as a mask, thereby forming second convex patterns 330b on the first convex patterns 330a as illustrated in FIG. 6D. The second convex patterns 330b are formed by etching the first convex patterns 330a, which are formed by using a part of the substrate like the first convex patterns 330a. Then, the second metal patterns 340b that remain on the second convex patterns 330a are removed, thereby forming the second convex patterns 330b of a convexo-concavo pattern on the surfaces of the first convex patterns 330a as illustrated in FIG. 6E.

Figure 7:
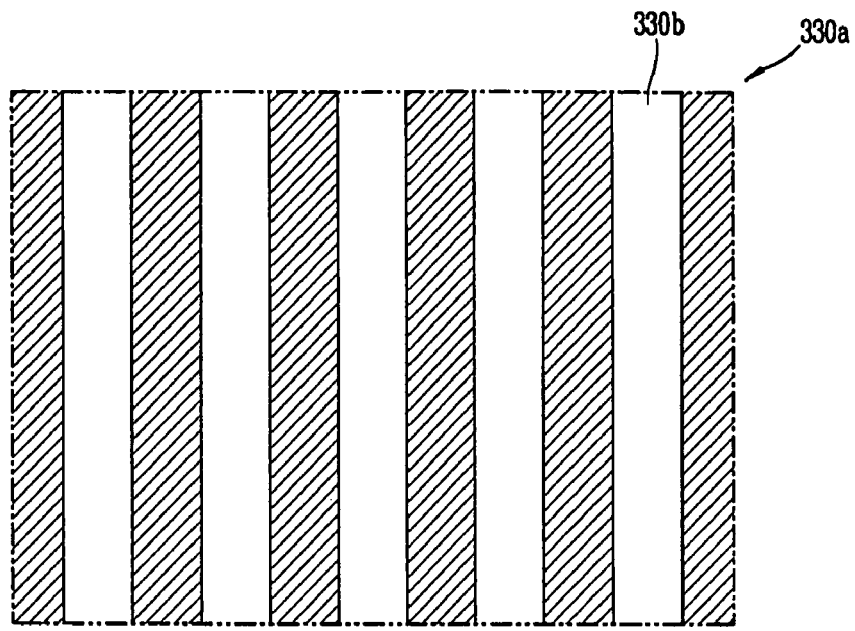
FIG. 7 is a view illustrating a shape of a second convex pattern of the cliché formed by the processes illustrated in FIGS. 6A to 6E.
Figure 8:
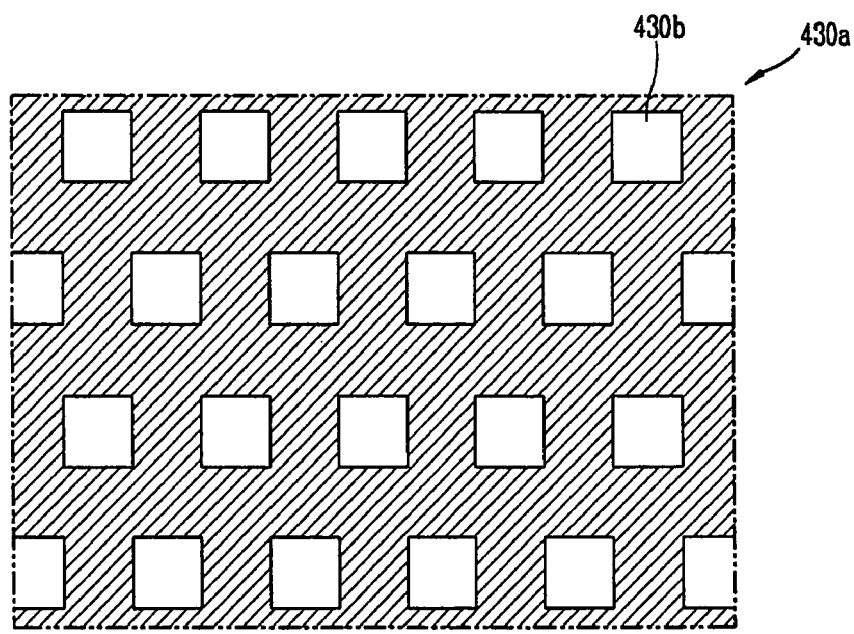
FIG. 8 is a view illustrating another shape of the second convex pattern of the cliché formed by the processes illustrated in FIGS. 6A to 6E.
Figure 9:
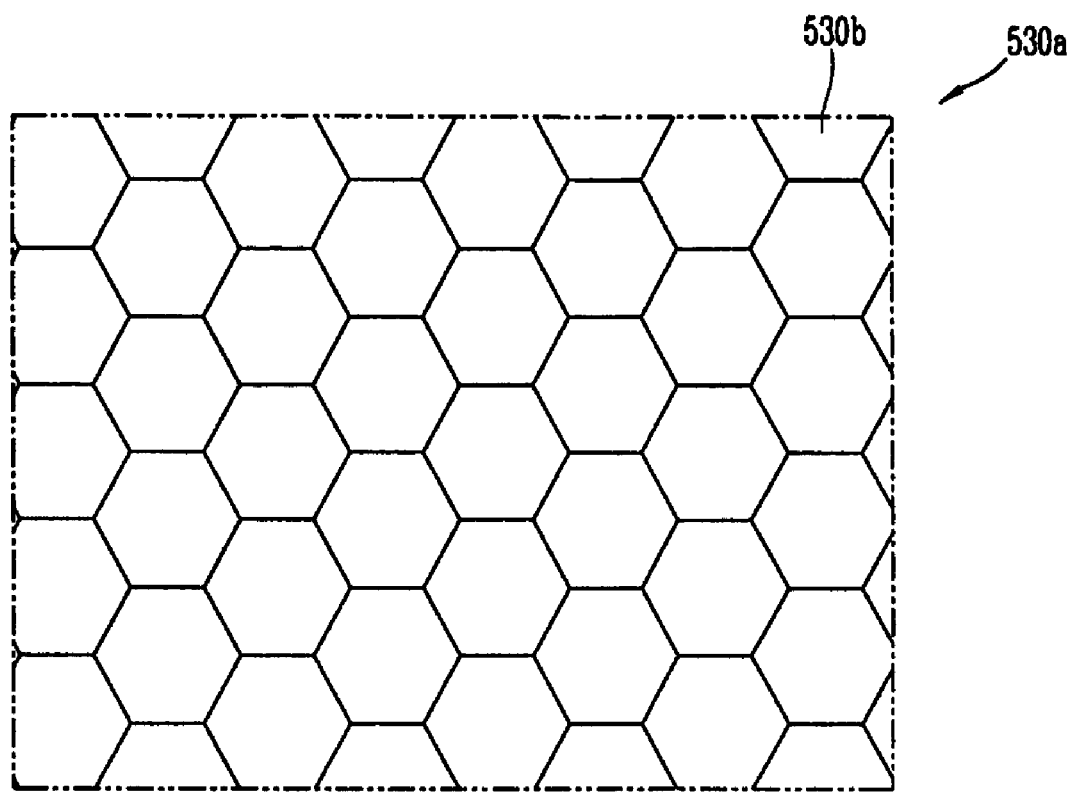
FIG. 9 is a view illustrating still another shape of the second convex pattern of the cliché formed by the processes illustrated in FIGS. 6A to 6E.

FIG. 7 illustrates a surface of the first convex pattern 330a on which the second convex pattern 330b is formed. As illustrated, on the surface of the first convex pattern 330a, the second convex pattern 330b is formed. The shape of the second convex pattern 330b is determined by the shape of the second metal pattern. If the second metal pattern has a bar shape, then the second convex pattern 330b also has a bar shape. Since the shape of the second convex pattern 330b is varied according to the shape of the second metal pattern, the second convex pattern 330b can have a dot shape 430a, as illustrated in FIG. 8 or an embossing shape 530b as illustrated in FIG. 9. However, the shape of the second convex pattern 330b is not limited to the above shapes. The second convex pattern is formed on the surface of the first convex pattern in order to increase a surface area of the first convex pattern, and the second convex pattern can have any shape.

The second convex patterns 330b, 430b, and 530b increase a contact area between the cliché and the ink applied onto the substrate during the processes of FIGS. 4A to 4G and FIGS. 5A to 5G thereby to increase an adhesion force between the cliché and the ink. Accordingly, when using the cliché having the second convex patterns, an adhesion force intensifier can be omitted. However, if the adhesion force intensifier is applied onto the surfaces of the second convex patterns, the adhesion force between the cliché and the ink is increased.

As aforementioned, in case of forming the first and second convex patterns by using the metal pattern as a mask, mask processes have to be performed two times. That is, a single mask process has to be performed in order to form the first metal pattern for forming the first convex patterns, and a single mask process has to be performed in order to form the second metal pattern for forming the second convex patterns. However, as aforementioned, the mask process (a photolithography process) is composed of complicated processes such as a photoresist deposition, an exposure process, a development process, etc., the increase of the number of the mask processes causes the production cost to be increased and the production efficiency to be lowered.

Figure 10A:
FIGS. 10A to 10F are views illustrating a method for fabricating a cliché according to another embodiment of the present invention.
Figure 10B:
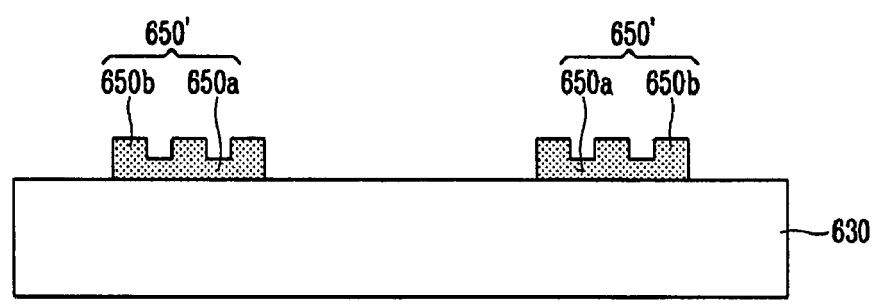

FIGS. 10A to 10F are views illustrating a method for fabricating a cliché according to another embodiment of the present invention. As illustrated in FIG. 10A, a transparent glass substrate 630 is provided, and then a photoresist 650 is applied on an entire surface of the substrate 630. The photoresist 650 is then diffraction-exposed or halftone-exposed, forming a photoresist pattern 650' having a first photoresist pattern 650a with a first thickness and a second photoresist pattern 650b with a second thickness that alternate with each other as illustrated in FIG. 10B. The diffraction exposure or halftone exposure is performed using a diffraction or halftone mask wherein an optical transmittance rate is differently set according to position. An exposed degree of the photoresist to light becomes different by an optical transmittance rate, and thereby a thickness of the photoresist pattern becomes different.

Figure 10C:
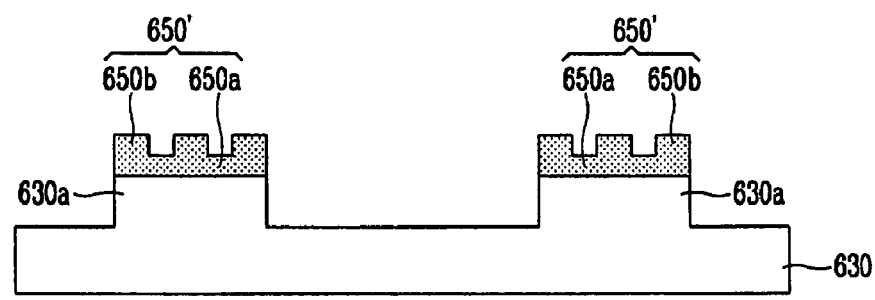
Figure 10D:
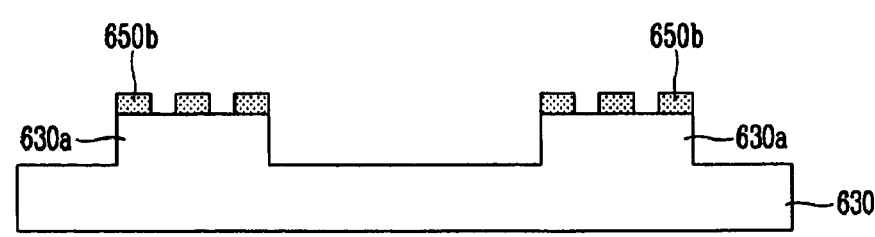
Figure 10E:
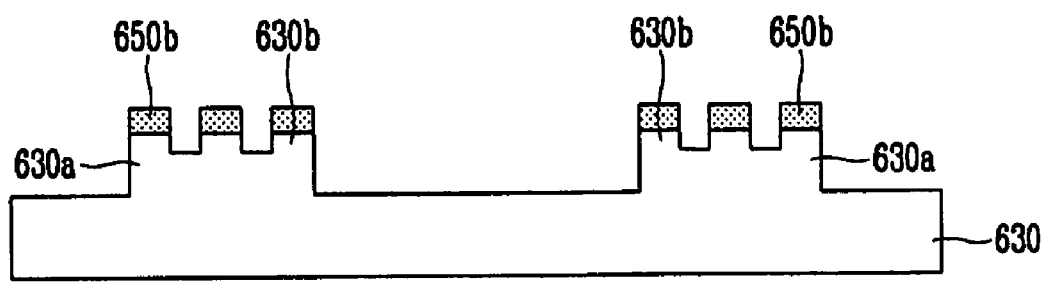

As illustrated in FIG. 10C, the glass substrate 630 is etched using the photoresist pattern 650' as a mask, thereby forming first convex patterns 630a. That is, the first convex patterns 630a are formed at regions that the photoresist patterns 650' are positioned. The first convex patterns 630a are formed by using a part of the glass substrate 630. As illustrated in FIG. 10D, the first photoresist patterns 650a are removed leaving only the second photoresist patterns 650b on the first convex patterns 630a. In the process that the first photoresist patterns 650a are removed, the thickness of the second photoresist patterns 650b becomes thin. The first photoresist patterns 650a can be removed using an ashing process, and can be formed on the first convex patterns 630a with a regular shape or with an irregular shape.

Then, the second photoresist patterns 650b are used as a mask to etch the first convex patterns 630a, thereby forming the second convex patterns 630b on the first convex patterns 630a. The second convex patterns 630b are formed by etching the first convex patterns 630a, which are formed by using a part of the glass substrate. The shape of the second convex patterns 630b is determined by the shape of the second photoresist patterns 650b, and the second convex patterns 650b can have various shapes as illustrated in FIGS. 7 to 9.

Figure 10F:
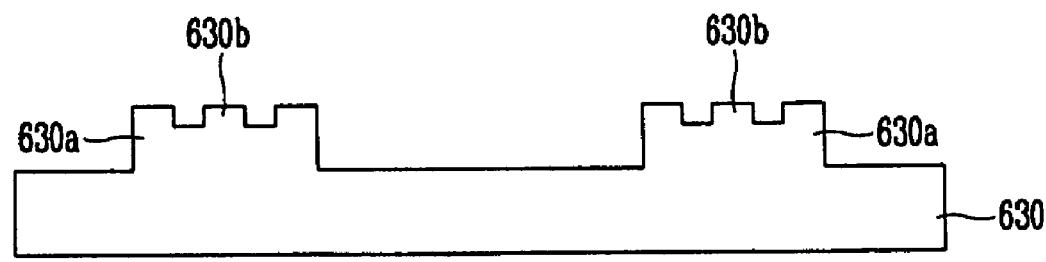

Finally, the second photoresist patterns 650b that remain on the second convex patterns 630b are removed, thereby forming the second convex patterns 630b of a convexo-concave shape on the first convex patterns 630a as illustrated in FIG. 10F.

In the method for fabricating a cliché according to the present invention, the first convex patterns and the second convex patterns are formed by a diffraction or halftone exposure to reduce the number of the mask processes by a single time.

As aforementioned, the present invention provides a method for forming a pattern capable of uniformly forming a thickness of an ink pattern using a cliché having convex patterns. Furthermore, the present invention provides a method for fabricating a cliché capable of enhancing an adhesion force between the cliché and ink, by increasing the contact area between the convex patterns of the cliché and the ink.

The method for forming a pattern by a printing method according to the present invention can be applied not only to an active device or a circuit of a display device such as an LCD device but also to a method for forming a device on a semiconductor substrater.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for fabricating a cliché comprising:
   providing a transparent glass substrate;
   depositing a metal layer on the substrate;
   patterning the metal layer to form a first metal pattern;
   etching the glass substrate using the first metal pattern as a mask, thereby forming a first convex pattern;
   patterning the first metal pattern to form a second metal pattern; and
   etching the first convex pattern using the second metal pattern as a mask, thereby forming a second convex pattern.

2. The method of claim 1, wherein the second convex pattern is formed on a surface of the first convex pattern.

3. The method of claim 1, further comprising:
   applying an adhesion force intensifier on a surface of the second convex pattern.

4. The method of claim 3, wherein the adhesion force intensifier is Hexa Methyl Disilazane (HMDS).

5. A method for fabricating a cliché comprising:
providing a transparent glass substrate;
depositing a photoresist on the substrate
forming a first photoresist pattern having a first thickness and a second photoresist pattern having a second thickness, the first and second photoresist patterns alternating with each other;
etching the glass substrate using the first photoresist pattern as a mask, thereby forming a first convex pattern; and
removing the first photoresist pattern, then etching the first convex pattern using the second photoresist pattern as a mask, thereby forming a second convex pattern.

6. The method of claim 5, wherein the second convex pattern is formed on a surface of the first convex pattern.

7. The method of claim 5, further comprising applying an adhesion force intensifier on a surface of the second convex pattern.

8. The method of claim 7, wherein the adhesion force intensifier is Hexa Methyl Disilazane (HMDS).

9. A method for forming a pattern comprising:
providing a cliché having a plurality of convex patterns and a plurality of convexo concavo patterns on surfaces of the convex patterns;
forming an etching object layer on a substrate;
applying ink on the etching object layer;
attaching the cliché and the substrate to each other so that the surfaces of the convex patterns are in contact with the ink applied onto the etching object layer; and
separating the substrate and the cliché from each other, thereby forming an ink pattern that partially remains on the etching object layer.

10. The method of claim 9, wherein the step of providing a cliché comprises:
providing a transparent glass substrate;
depositing a metal layer on the substrate;
patterning the metal layer to form a first metal pattern;
etching the glass substrate using the first metal pattern as a mask, thereby forming a first convex pattern;
patterning the first metal pattern to form a second metal pattern; and
etching the first convex pattern using the second metal pattern as a mask, thereby forming a second convex pattern on a surface of the first convex pattern.

11. The method of claim 9, wherein the step of providing a cliché comprises:
providing a transparent glass substrate;
depositing a photoresist on the substrate
forming a first photoresist pattern having a first thickness and a second photoresist pattern having a second thickness, the first and second photoresist patterns alternating with each other;
etching the glass substrate using the first photoresist pattern as a mask, thereby forming a first convex pattern; and
removing the first photoresist pattern, then etching the first convex pattern using the second photoresist pattern as a mask, thereby forming a second convex pattern.

12. The method of claim 9, wherein in the separating the substrate and the cliché from each other, ink that is in contact with the convex patterns of the cliché is attached to the convex patterns thereby removing the ink from the etching object layer.

13. The method of claim 9, wherein the ink pattern formed on the etching object layer is formed at regions that are not in contact with the convex patterns of the cliché.

14. The method of claim 9, further comprising:
hardening the ink pattern.

15. The method of claim 9, further comprising etching the etching object layer by using the ink pattern as a mask.

16. The method of claim 14, wherein the hardening the ink pattern comprises applying heat on the ink pattern.

17. The method of claim 14, wherein hardening the ink pattern comprises irradiating ultraviolet rays on the ink pattern.

* * * * *